United States Patent [19]

Lalloz et al.

[11] 4,424,180

[45] Jan. 3, 1984

[54] PROCESS FOR THE PRODUCTION OF EXPANDED SYNTHETIC MATERIAL ARTICLES HAVING VARIABLE PHYSICAL CHARACTERISTICS

[75] Inventors: Guy Lalloz, Froideconche; Gabriel Joly, Luxeuil-les-Bains, both of France

[73] Assignee: Saplest S.A., Faucogney et la Mer, France

[21] Appl. No.: 406,408

[22] Filed: Aug. 9, 1982

[30] Foreign Application Priority Data

Aug. 13, 1981 [FR] France .................................. 81 15705

[51] Int. Cl.³ .............................................. B29D 27/00
[52] U.S. Cl. ..................................... 264/51; 264/321; 264/DIG. 4; 425/4 R
[58] Field of Search ............. 264/53, 51, 321, DIG. 4; 425/4 R

[56] References Cited

U.S. PATENT DOCUMENTS 3,264,381 8/1966 Stevens .............................. 264/53 X

*Primary Examiner*—Philip E. Anderson
*Attorney, Agent, or Firm*—Seidel, Gonda & Goldhammer

[57] ABSTRACT

According to the process, the shape of the mold cavity is at least partly modified at the point where it is desired to modify the physical characteristics of the molding during production. After the synthetic material is injected into the mold and hot expanded to fill the mold, the mold cavity is expanded at the point where the physical characteristics are to be modified and the molding is allowed to expand in a complementary manner in order that the material completely fills the expanded cavity. Then there is a compression of the molding and the molding is cooled to fix its shape.

10 Claims, 17 Drawing Figures

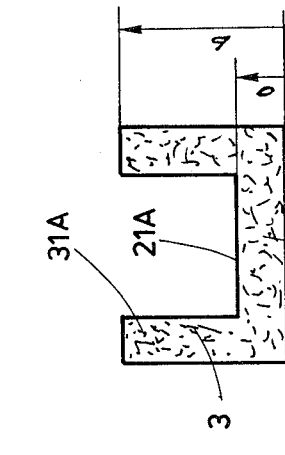
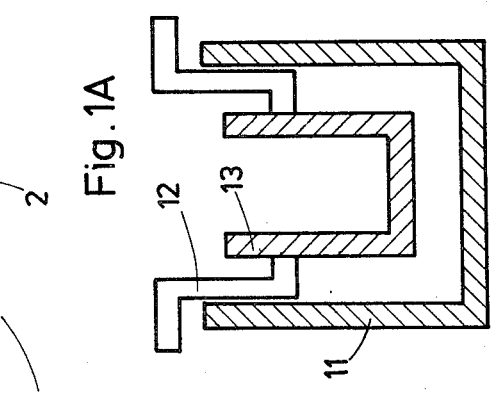
Fig. 1A  Fig. 2A
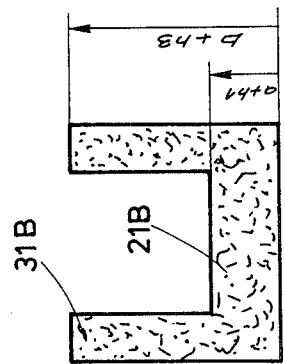
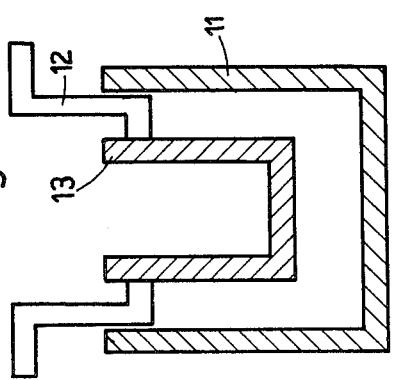
Fig. 1B  Fig. 2B
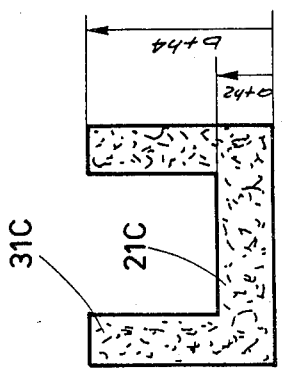
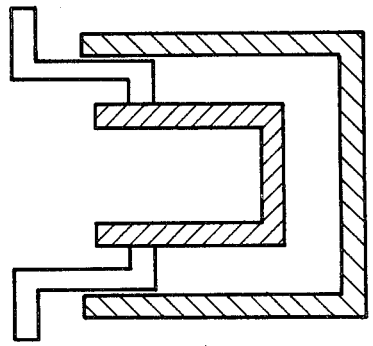
Fig. 1C  Fig. 2C

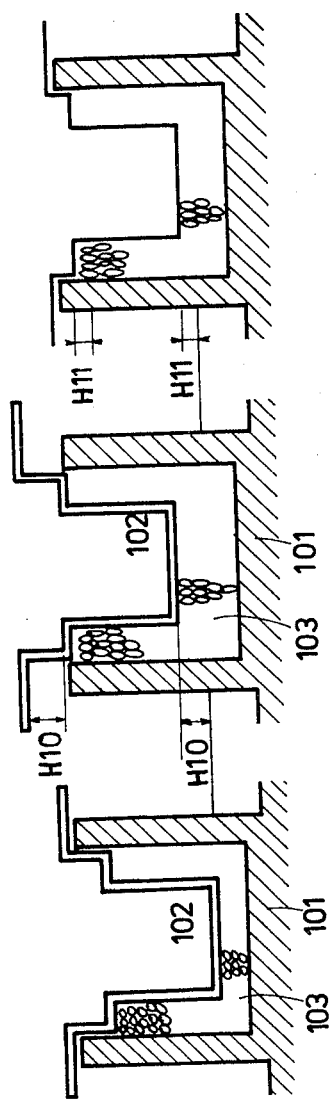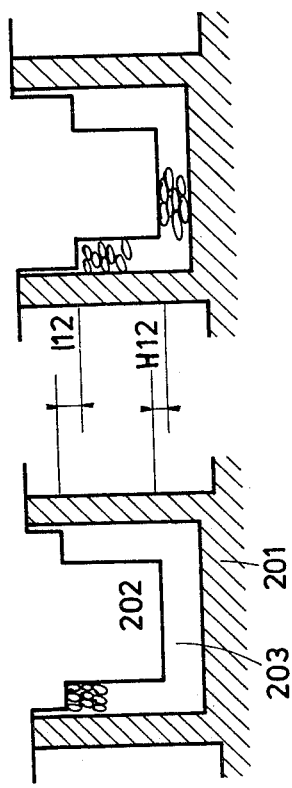

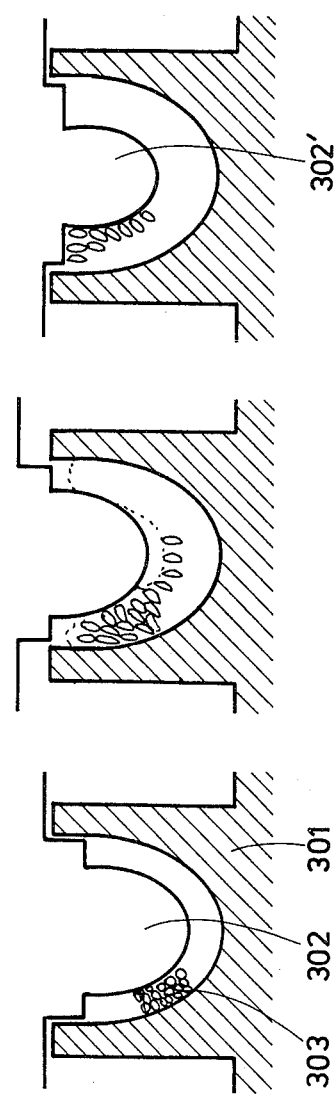
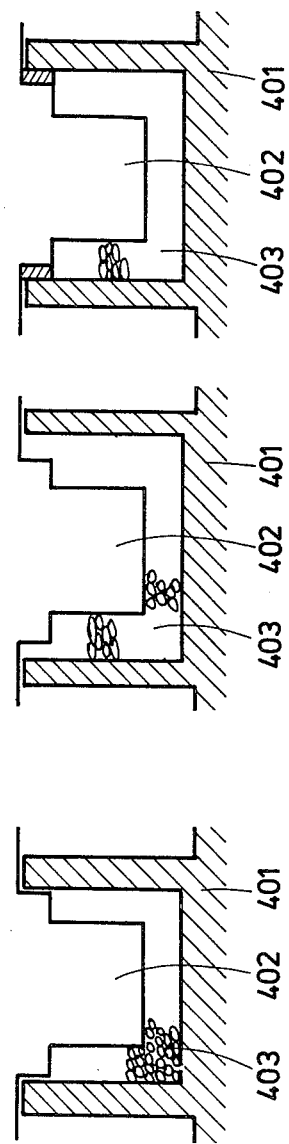

PROCESS FOR THE PRODUCTION OF EXPANDED SYNTHETIC MATERIAL ARTICLES HAVING VARIABLE PHYSICAL CHARACTERISTICS

The present invention relates to a process for the production of expanded synthetic material articles having variable physical characteristics which are predetermined as a function of the intended use, such as the mechanical characteristics, thermal or sound insulation characteristics, etc.

As is known, the examination of expanded synthetic moldings and in particular expanded polystyrene moldings has revealed that the expanded cells have different shapes depending on their spacing from the faces of the molding.

Generally over the outer faces of the molding the cells have a spherical shape which is crushed to a greater or lesser extent over a large diameter, whereas in the part remote from these outer faces, the cells are elongated in the form of grains of rice having random orientations.

However, on the basis of material strength considerations, it is possible to forecast that the strength of a flattened expanded material cell is low in the direction of its smallest thickness and has a certain elasticity. In the case of an expanded material cell shaped like grains of rice, the strength is relatively high in the longitudinal direction.

It is known to utilize the flexibility of flattened cells in the case of expanded synthetic material plates. In order to obtain relatively flexible plates, the surface of the plates is rolled immediately after production in order to crush or flatten the initially spherical cells.

However, this process is on the one hand limited to plates and on the other to a single crushing operation. The more or less disordered elongation of the cells such as is encountered on the presently produced molded articles is only a consequence of expansion. These elongated cells are located in the core of the article. The orientation is of a random nature and does not modify the physical characteristics of the molding. No means exist making it possible to produce elongated cells oriented in a specific direction.

However, the increase and diversification of production of synthetic material moldings makes it desirable to be able to produce moldings having variable physical characteristics, such as a greater hardness, a greater flexibility, etc., with respect to the complete molding or to only part thereof.

The invention proposes producing means making it possible to produce synthetic material moldings having wholly or partly predetermined physical characteristics.

The present invention therefore relates to a process for the production of expanded synthetic material and in particular expanded polystyrene moldings, whereby during an initial phase the synthetic material is expanded in a precisely shaped hot mold and then during a final phase the shape of the molding is stabilized, characterized in that during an intermediate phase between the initial phase and the final phase, the shape of the mold cavity is partly modified at the location where it is desired to modify the mechanical characteristics of the molding during production, the molding is allowed to expand in a complementary manner in such a way that the material completely occupies the cavity and during the final phase, the shape of the mold cavity is at least partly modified compared with the shape of the intermediate phase, followed by compression and cooling to fix the shape of the molding.

Thus, as a result of the complementary expansion and the more or less marked compression in order to stabilize the molding in its final shape, it is possible to locally or totally modify the strength or in more general terms the physical characteristics of a molding in order to better adapt it to its intended use. It is also possible to produce relatively flexible moldings for absorbing shocks or impacts, e.g. moldings which are to receive fragile or brittle products, etc.

It is also possible to produce moldings having a relatively high mechanical strength, e.g. like a protective helmet cover, whose upper part must be hard and whose edges must be flexible.

According to another advantageous feature of the invention, a mold is used which partly differs between the initial and intermediate phases on the one hand and the final phase on the other.

According to another feature, the mold used for performing the final phase is at least partly different from the mold used in the initial and intermediate phases.

In summarizing, the shape change of the mold cavity, i.e. the interior of the mold, can be obtained either by a movement or a displacement of parts of the mold relative to one another or by a total or partial changing of the mold. However, this change is only possible between the intermediate phase and the final phase, because there is not only a change in the shape of the mold, but it is also necessary to cool the molding in order to bring about its final stabilization. However, in a particularly advantageous manner, it is possible to at least partly change the mould at this time.

The invention is described in greater detail hereinafter relative to nonlimiting embodiments and the attached drawings, wherein:

FIGS. 1A, 1B, and 1C show the shape of a molding during the first three phases of its production from expanded synthetic material.

FIGS. 2A, 2B, 2C show diagrammatically an example of a mold for performing the process according to FIGS. 1A, 1B, 1C.

FIGS. 3A, 3B, and 3C show diagrammatically a mold during the first three production phases of a first example of a molding.

FIGS. 4A and 4B show views similar to those of FIGS. 3A, 3B, 3C during the production of another example of a molding.

FIGS. 5A, 5B, and 5C show the production of a curved molding.

FIGS. 6A, 6B, and 6C show the production of a parallelepiped molding.

In general terms the process according to the invention consists of injecting material into a mold, hot expanding the material and then during the expansion phase bringing about a chosen adiobatic expansion, which is followed by a further chosen compression to bring the molding into its final form.

The terms "expansion", "compression" and "chosen" signify that the location where expansion or compression take place, as well as the magnitude of the expansion and compression are chosen as a function of the molded article or molding to be produced, i.e. the desired mechanical strength of the surface of the molding. This also means that the expansion at one point of the molding can be made differently from that at another point, which also applies in connection with the compression.

In order to simplify the general description of the process, the following description will be made with reference to FIGS. 1A, 1B and 1C diagrammatically representing the shape of the molding during the three production phases, namely
initial injection and expansion phase (FIG. 1A);
intermediate complementary expansion phase (FIG. 1B);
final stabilization phase (FIG. 1C).

The process will be described in its application to the production of a box-shaped molding having a bottom 2 and walls 3.

According to the invention it is proposed to modify the mechanical characteristics of surfaces 21A, 31A (FIG. 1A) of the molding. In order to show the position of surfaces 21, 31, the latter are designated by their distance a, b, ... from the external base of the molding. In the same way references 21A, 21B, 21C and 31A, 31B, 31C are used for designating the position of surfaces 21 and 31 during the three operating phases according to FIGS. 1A, 1B and 1C. In each of these drawings, the position of the surfaces to be modified is designated by distances a, b; a+$h_1$, b+$h_3$ and a+$h_2$, b+$h_4$ (FIGS. 1A, 1B, 1C).

The process takes place in the following way.

Initial injection and expansion phase (FIG. 1A):

When the mold is closed, the synthetic material to be expanded, e.g. polystyrene in the form of pre-expanded balls is injected into it, followed by the heating of the mold and the injection of steam. The material swells by expansion of the spherical particles and assumes the shape shown in FIG. 1A.

Face 21A of bottom 2 and faces 31A of walls 3 are then at distances a and b with respect to the reference line.

Complementary expansion phase (FIG. 1B):

At the end of the expansion phase the mould cavity shape is modified to allow the material, which is still under pressure, to expand at surfaces 21A, 31A, whereas the other faces or surfaces of the molding remain blocked. As a result of this expansion surfaces 21A, 31A arrive in positions 21B, 31B, which are respectively at distances a+$h_1$ and b+$h_3$. Distances $h_1$, $h_2$, $h_3$ and $h_4$ represent the variations of the dimension of the mold in a given direction, variations $h_1$ and $h_3$ always being zero or positive. Variations $h_2$ and $h_4$ are positive, zero or negative.

During this complementary expansion, the particles at surfaces 21B, 31B which were spherical or flattened, are elongated in the direction of the volume increase of the mold cavity.

Final stabilization phase (FIG. 1C):

Following the complementary expansion, the shape of the mold is again modified to compress surfaces 21, 31 of the molding and bring them into positions 21C, 31C spaced respectively by a+$h_2$ and b+$h_3$. This compression operation leads to a more or less marked crushing of the previously expanded cells at surfaces 21, 31. In general terms, the choice of the expansions/compressions is dependent on the mechanical characteristics which it is desired to obtain.

FIGS. 2A, 2B, 2C show an example of a mould having three elements 11, 12, 13 permitting the performance of the aforementioned process. FIGS. 2A, 2B, 2C respectively show the position of the mold elements giving the shapes of the molding according to FIGS. 1A, 1B, 1C. Although in FIGS. 2A, 2B, 2C it is the same mold it is also possible to use different molds or mold elements.

The mold used in phases 1 and 2 (FIGS. 1A, 2A; 1B, 2B) is the same. If the variations $h_1$, $h_3$ ... are different, it is necessary to have the same number of mold elements with different relative settings or movements.

However, if all the variations are the same $h_1 = h_3 \ldots$, elements 12, 13, etc. can be rendered integral and formed into a single part. It is also indispensable that there is no mold change during phases 1 and 2, because the complementary expansion phase must take place hot and is preferably adiobatic.

For phase 3 the mold can at least partly differ from that of phases 1 and 2, not only on the basis of the cavity dimensions, so that it can be an at least partly new mold.

Thus, as stabilization to the final shape takes place by cooling the molding, it is of interest to save heat by not unnecessarily cooling the hot mold. For this purpose the molding can be transferred from the hot mold (phase 2) to another cold mold (phase 3).

It is also important to note that the molds and mold elements, as well as the relative settings and displacements of the mold elements in each of the phases 1, 2, 3 define a mold cavity having specific precise dimensions. This precision is necessary not only for the shaping and final stabilization operation, but also for the shape of the molding at the end of phases 1 and 2. Thus, the modifications of the mechanical characteristics depend solely on the value of variations $h_1$, $h_2$, $h_4$, $h_3$, and the precision of these variations. As these variations can be of the order of a few mm, the importance of the precision of the molds during each phase of the process is clearly stressed.

The invention will now be explained by means of a number of Examples.

Example 1 (FIGS. 3A, 3B, 3C)

For this example, a mold formed from elements 101, 102 is used in order to produce a box-shaped packing 103. It is proposed to increase the strength in the same way as in FIGS. 2A, 2B, 2C.

FIGS. 3A, 3B, 3C diagrammatically show the shape of the expanded material cells during the various phases.

Thus, in FIG. 3A during the expansion in the hot mold, the cells have a roughly spherical shape and are stuck to one another. Then during the complementary expansion phase (FIG. 3B), the cells are elongated in the mold dimension variation direction, i.e. in this case in the direction of mold opening by a relative movement of part 102 with respect to part 103. The cells at the bottom of the molding and those level with the upper edge are elongated in the manner shown.

In the final shaping phase of FIG. 3C, the previously elongated cells are compressed to a greater or lesser extent. The travels of part 102 of the mold are respectively designated by $H_{10}$ and $H_{11}$ in FIGS. 3B, 3C.

The molding produced according to the process of FIGS. 3A, 3B, 3C has better compression strength characteristics in the mold opening direction because the cells are elongated in this direction.

Example 2 (FIGS. 4A, 4B)

This example is similar to that of FIG. 1, except that the final phase is a more marked compression phase, the compression leading to the molding having a size less than that at the end of the first phase (FIG. 4A). This is diagrammatically represented by the distances $H_{12}$ shown in the drawings.

As a result of this more marked compression, the spheres are crushed after having elongated them giving flattened elements having a very high damping power and which may be of interest for producing boxes, containers, or other members for receiving or holding fragile or brittle parts.

Example 3 (FIGS. 5A, 5B, 5C)

This example proposes to produce a molding having a greater strength than a conventional molding in the direction perpendicular to the opening of the mold. The thus produced molding is cup or dome-shaped. For this purpose a mold having two elements 301, 302 is used, the molding to be produced being designated by 303.

During the first phase, expansion is brought about in a hot mold (FIG. 5A). During the second phase complementary expansion is brought about with adiobatic expansion by slightly opening the mold, i.e. by drawing element 302 relative to element 301.

During the final phase, final shaping takes place by means of mold element 302' having a shape different from that of the preceding mold. During this final phase, the elongated orientation of the cells is maintained in a direction towards the surface of mold 302'.

Example 4 (FIGS. 6A, 6B, 6C)

The production of a parallelepiped molding having a strength of the same type as that of the molding of FIGS. 5A, 5B, 5C is shown in FIGS. 6A, 6B, 6C.

For this purpose it is necessary to modify the dimensions of mould element 402 in FIG. 6B in order to permit the elongation of the cells in the direction perpendicular to the opening. During the third phase a mold having appropriate dimensions for compressing to a greater or lesser extent the cells is used. However, a direction perpendicular to the mold opening direction is retained as the elongation direction.

The description of the above examples has assumed traditional production conditions for the expanded synthetic material moldings. Thus, in the presently existing installations, the molds are produced in two parts opening along a parting line chosen as a function of the dimensions of the two molds parts or elements, the shape of the molding to be produced, etc.

Such molds are to a certain extent usable for performing the process according to the invention, the expansion or complementary expansion phase then consisting of partly opening the mould to increase its internal volume and permit the complementary expansion. However, such moulds are only usable in relatively limited cases for which the variation of the mechanical characteristics sought for the moulding are located level with areas of the moulding able to expand in a complementary manner or to be compressed by the at least partial opening of the mould.

However, for the production of more complex moldings having a different mechanical strength or located in areas not touched by the mould opening movement, it is necessary to use mould elements having a more complex shape and which can be moved and regulated relative to one another in a direction differing from that of mould opening.

The process described hereinbefore can also be continuously performed for the production of plates or strips which will subsequently be cut into sheets or flat elements.

In this case it is merely necessary to replace the moulds or the mould shape variations corresponding to the three phases by calenders or conveyor belts between which is brought about the expansion of the material or by belts whose spacing is chosen so as to firstly obtain an expansion, then a complementary expansion and finally a compression to the appropriate value, depending on whether it is necessary to produce sheets or plates, whose surfaces are stronger or more flexible then those of the sheets or plates produced by a conventional process.

We claim:

1. A process for the production of an expanded synthetic material molding comprising:
   (a) expanding the synthetic material in a precisely shaped cavity of a hot mold,
   (b) modifying the mechanical properties of the molding during production by enlarging the size of the cavity, expanding the material into the enlarged cavity until it occupies the enlarged cavity,
   (c) then compressing at least a part of the molding of step (b) to attain the final shape, and
   (d) stabilizing the final shape.

2. A process in accordance with claim 1 wherein only a localized portion of the mold cavity is enlarged during step (b).

3. A process in accordance with claim 1 wherein only a localized portion of the mold cavity is compressed during step (c).

4. A process in accordance with claim 1 wherein the volume of the mold cavity at the end of step (c) is less than the volume of the mold cavity at the beginning of step (b).

5. A process in accordance with claim 1 wherein the dimensions of the mold cavity are modified no more than a few millimeters.

6. A process in accordance with claim 1 wherein the volume of the mold cavity is modified no more than a few percent.

7. A process in accordance with claim 1 wherein the synthetic material is polystyrene balls.

8. A process in accordance with claim 1 wherein only a part of the molding which is desired to have high damping is compressed during step (c).

9. A process in accordance with claim 1 including producing a molding having a final shape which is cup-shaped.

10. A method in accordance with claim 1 including performing step (c) in a mold different from the mold used for step (b).

* * * * *